United States Patent [19]
Ueno

[11] Patent Number: 5,473,324
[45] Date of Patent: Dec. 5, 1995

[54] MAP DISPLAY APPARATUS

[75] Inventor: Naoki Ueno, Fukuoka, Japan

[73] Assignee: Matsushita Electric Industrial Co., Ltd., Osaka, Japan

[21] Appl. No.: 163,694

[22] Filed: Dec. 9, 1993

[30] Foreign Application Priority Data

Dec. 28, 1992 [JP] Japan .................................. 4-348811

[51] Int. Cl.$^6$ .................................................. G08G 1/123
[52] U.S. Cl. ........................ 340/990; 340/995; 345/133
[58] Field of Search ................................... 345/126, 133; 340/911, 992, 995, 286.14, 525, 990

[56] References Cited

U.S. PATENT DOCUMENTS

| | | | |
|---|---|---|---|
| 4,608,656 | 8/1986 | Tanaka et al. | 340/995 |
| 4,792,907 | 12/1988 | Ikeda et al. | 340/995 |
| 4,992,947 | 2/1991 | Nimura et al. | 340/990 |
| 5,113,185 | 5/1992 | Ichikawa | 340/995 |
| 5,220,507 | 6/1993 | Kirson | 340/995 |

FOREIGN PATENT DOCUMENTS

| | | | |
|---|---|---|---|
| 0485120 | 11/1991 | European Pat. Off. | 340/995 |
| 0527038 | 8/1992 | European Pat. Off. | 340/995 |
| 3-60333 | 3/1991 | Japan | 340/990 |
| 3188319 | 9/1991 | Japan | 340/995 |

OTHER PUBLICATIONS

"NAPLPS Standard Graphics and the Microcomputer", L. Lax and M. Olsen, Byte, Jul. 1983, p. 82.

*Primary Examiner*—Curtis Kuntz
*Assistant Examiner*—Vivian W. Chang
*Attorney, Agent, or Firm*—Stevens, Davis, Miller & Mosher

[57] ABSTRACT

The present invention includes a map information storage unit which stores map information, an information read-out device which reads out the map information stored in said map information storage unit, a display which displays on a screen the map information read out by the map information read-out device from the map information storage unit, a route map preparing device which prepares on the displayed map all the routes made up of line segments connecting the starting point and the successive passing points up to the end point, and a device for detecting the present position of the vehicle. The present invention further includes a control device which carries out control operations so that a sub-screen displaying the above-described map including all the routes and the present position of the vehicle is displayed on the screen displaying the map information read out by said information read-out device and the present position of the vehicle detected by said device for detecting the present position of the vehicle.

10 Claims, 5 Drawing Sheets

MAP DISPLAY APPARATUS

BACKGROUND OF THE INVENTION

1. Field of the Invention

The present invention relates to a map display apparatus associated with a navigation system used as a travel-assisting system for cars or other vehicles.

2. Description of the Related Arts

In recent years, car navigation systems using, for example, GPS (Global Positioning System: A system which computes the position of one's vehicle using vehicle position information sent from a satellite), have been constructed as assisting systems for cars or other vehicles to carry out navigation to the vehicle's destination. In general navigation systems, navigation has been carried out by displaying on an LCD (Liquid Crystal Display) and other map display apparatus map information stored in an external storage device such as a CD-ROM, routes previously input by the user, together with the position of the vehicle obtained from the GPS. A conventional map display apparatus will be hereunder described.

FIG. 8 is a block diagram of the functional parts of a conventional map display apparatus. Reference numeral 81 denotes an input means by which the user inputs the routes; reference numeral 82 denotes an external storage device such as the CD-ROM in which the map information is stored; reference numeral 83 denotes an information read-out means for reading out the map information stored in the map information storage device 82; reference numeral 84 denotes a means for computing the present position of the vehicle by the GPS or and other such travel-assisting systems; and reference numeral 85 denotes a display means for displaying the desired map information at any scale arbitrarily selected by the user, with the present position of the vehicle computed by the means 84 for computing the present position of the vehicle located in the center of the displayed map.

The flow of operations carried out in the conventional map display apparatus having the above-described structure will be described with reference to the flow chart in FIG. 9. First, the user searches the map information, including the route starting point S, by use of the map information storage means 82 for displaying the map on the display means 85 at a scale arbitrarily selected by the user (Step 90). The user then uses the input means 81 to input the route starting point S, passing points P1, P2, . . . , and point of destination E on the displayed map in accordance with the route order intended to be taken by the user (Step 91), thereby completing the input of the routes.

After starting the navigation of the vehicle, the user then uses the means 84 for computing the vehicle's present position, such as the GPS, to compute the present position of the vehicle (Step 92). The user displays the road information map showing the computed result at an easily readable map scale on the display means 85, with the present position of one's vehicle being at the center thereof (Step 93). The vehicle is navigated by repeating Steps 92 and 93 until the response to the question posed in Step 94 (Destination E Reached?) is yes, in accordance with the operations input in Step 91.

An example of an actual map displayed on the screen of a conventional display apparatus will be described with reference to FIG. 10. Reference numeral 101 denotes a mark indicating one's own vehicle; and reference numeral 102 denotes one of the passing points P input in Step 91 by means of the input means 81. During navigation, the map is displayed on a display means 85 at a scale which allows easy reading of the roads of the area around the center of the map, where the present position of the moving car is located. If the user wants to know the routes which he has taken up to the present time, or if he wants to have a general view of the routes he will take, he needs to change the scale of the displayed map to that which shows all the routes. In addition, after confirming the routes, the scale of the map must be changed to that showing the most detailed road features of the area around the present position of the moving vehicle.

As described above, the conventional map display apparatuses have problems which require the user to change the scale of the map displayed on the display means to that which shows all the routes every time the user wants to know the routes he has taken up to the present time or when he wants to have a general view of the routes he will take. The user is also required, after confirming the routes, to return the scale of the map back to that which shows the greatest detail of the roads of the area around the present position of the moving vehicle.

SUMMARY OF THE INVENTION

In view of such inconvenience in carrying out the operations of the prior art, the present invention has as its object the provision of a safe map display apparatus for use in a navigation system which allows the user to immediately know the general routes, without requiring the user to change the scale of the map during navigation.

The present invention comprises a map information storage means which stores map information; an information read-out means which reads the map information stored in the above-described map information storage means; a display means which displays on a screen the map information read out from the above-described map information storage means by means of the above-described map information read-out means; a route map preparing means which prepares a map showing all the routes made up of line segments connecting the starting point and the successive passing points to the end point on the map displayed on the screen of the above-described display means; a detecting means for detecting the vehicle's present position; and a control means which carries out control operations so that a subscreen displaying the aforementioned map showing all the routes and the vehicle's present position displayed is displayed on one portion of the screen displaying the map information read out from the above-described information read-out means and the present position detected by the above-described detecting means.

DETAILED DESCRIPTION OF THE PREFERRED EMBODIMENTS

Referring to FIGS. 1 through 7, one embodiment of the present invention will be described.

Figure 1:
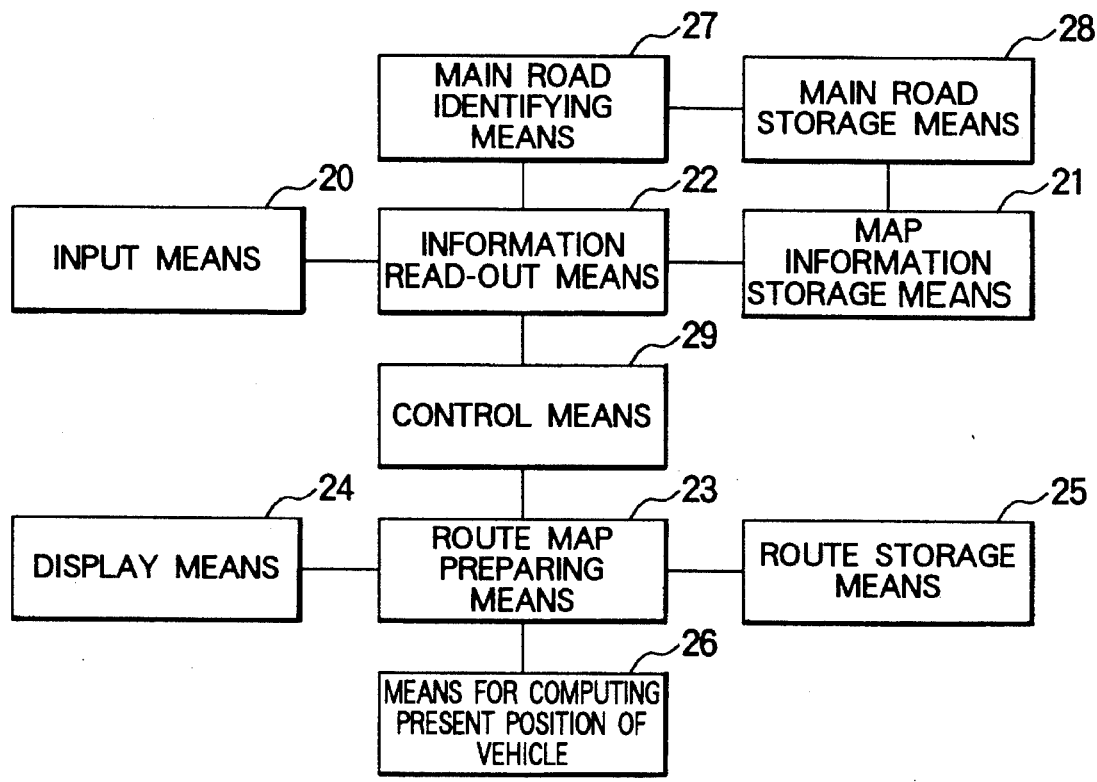
FIG. 1 is a functional portion block diagram of one embodiment of the present invention.

FIG. 1 is a block diagram of the functional portions of the map display apparatus of one embodiment of the present invention, in which reference numeral 20 denotes an input means by which the user inputs the routes, reference numeral 21 denotes a map storage means, a CD-ROM, where the map information is stored, reference numeral 22 denotes an information read-out means for reading out the map information stored in the map information storage means 21, reference numeral 26 denotes a means for detecting the present position of one's vehicle by GPS or another assisting systems, reference numeral 24 denotes a display means for displaying the vehicle's present position detected by the detecting means 26 together with a map whose scale can be arbitrarily changed by the user with the vehicle's present position centered thereon, reference numeral 25 denotes a route storage means which stores the vehicle position data including the starting point, passing points, and destination point on the map input by the user using an input means 20, reference numeral 27 denotes a main road identifying means which extracts data related to the main roads alone from the map information stored in the map information storage means 21, reference numeral 28 denotes a main road storage means for storing data of the main roads extracted by the main road identifying means 27, and reference numeral 29 denotes a control means for generally controlling each of the above-described means. The control means 29 carries out control operations to display the map at a scale preferred by the user on the display means 24 centered on the vehicle's present position detected by the detecting means 26, or to display the route map on one portion of the display. It also carries out control operations to display a subview (described later), or to change the areas where the route map and the map are displayed.

Figure 2:
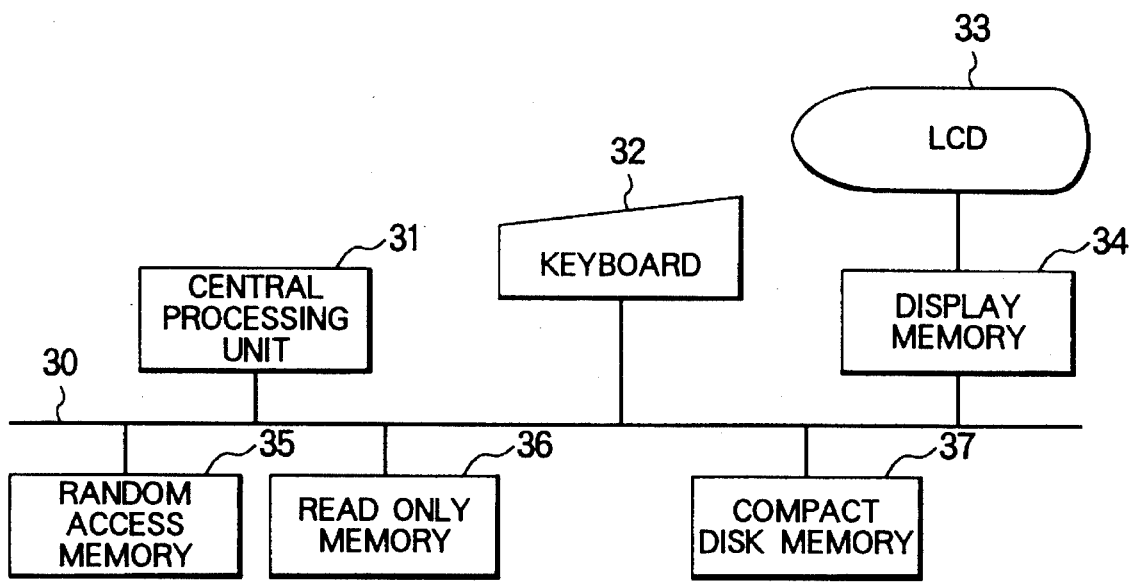
FIG. 2 is a circuit block diagram of one embodiment of the present invention.

FIG. 2 is a circuit block diagram of the present embodiment, in which reference numeral 30 denotes a bus for transmitting and receiving signals which connect each part, reference numeral 31 denotes a central processing unit which implements the control means 29 and performs operations for the present position-detecting means 26, the route map-preparing means 23, the information readout means 22, the main road identifying means 27, and the like, and performs general processing and control operations for the above-described means. Reference numeral 32 denotes a keyboard for implementing the input means 20, by which the user actually keys in the starting point, the passing points, the point of destination, and the like; reference numerals 34 and 33 denote respectively a display memory and a liquid crystal display diode (LCD) display means which allow the user to display a map of any scale centered on the vehicle's present position detected by the present position detecting means 26, or to display a route map over one portion of the aforementioned displayed map, or further to display the processing results of the control means 29 which is capable of changing the areas in which the route map and the main map are displayed; reference numeral 35 denotes a random access memory (RAM) which implements the main road storage means 28 by storing the route information and temporarily storing the operation results; and reference numeral 36 denotes a read only memory (ROM) into which is programmed the processing Steps of the information read-out means 22, the route map-preparing means 23, the present position-detecting means 26, and the like; and reference numeral 37 denotes a compact disk memory (CD) which stores map information and implements the map information storage means 21.

Figure 3:
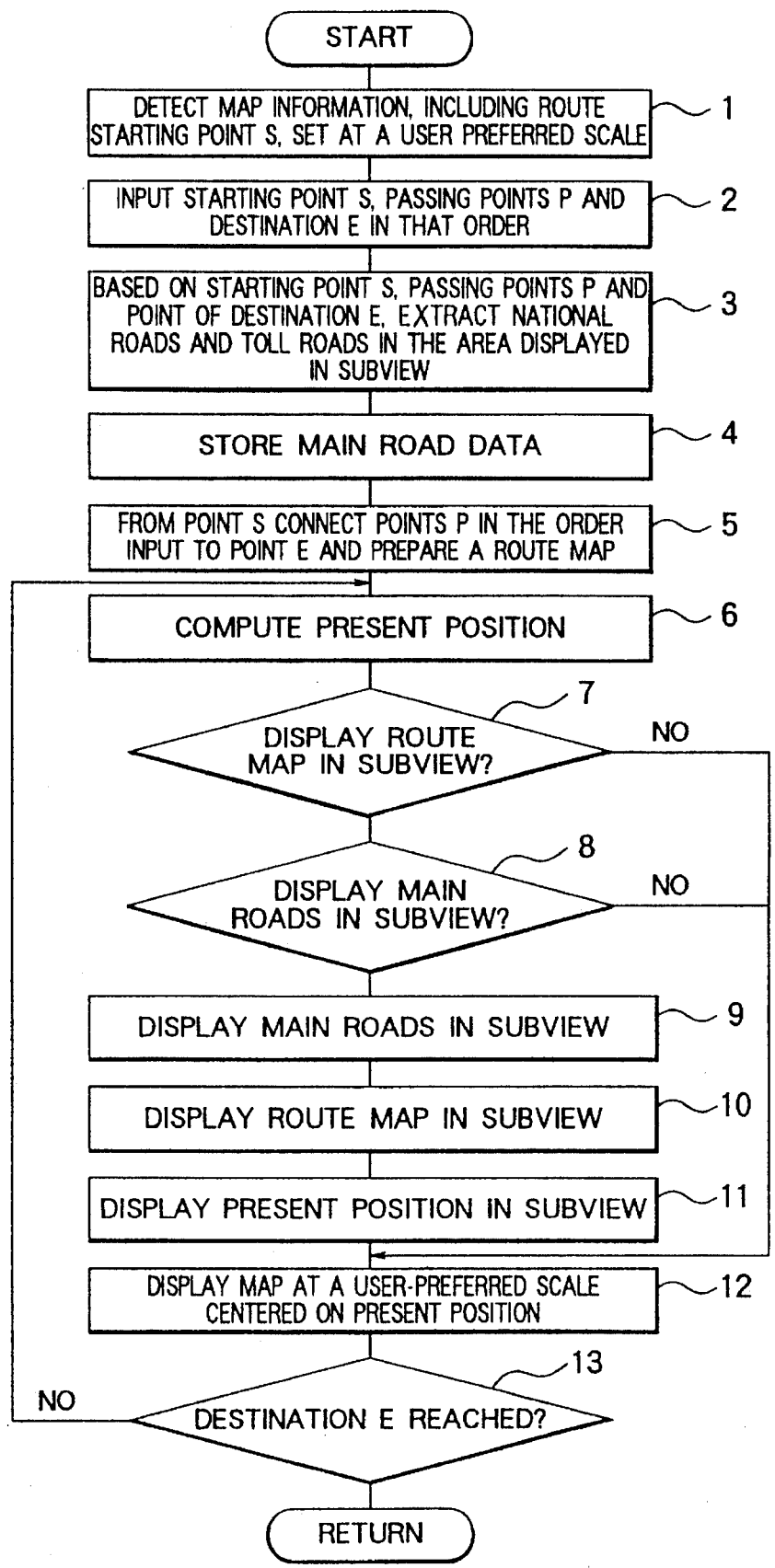
FIG. 3 is a flow chart of one embodiment of the present invention.

The map display apparatus of the present embodiment having the above-described structure will be described with reference to FIG. 3 which is an operation flow chart and FIGS. 4, 5, 6, and 7 which show an example of a displayed map.

Figure 4:
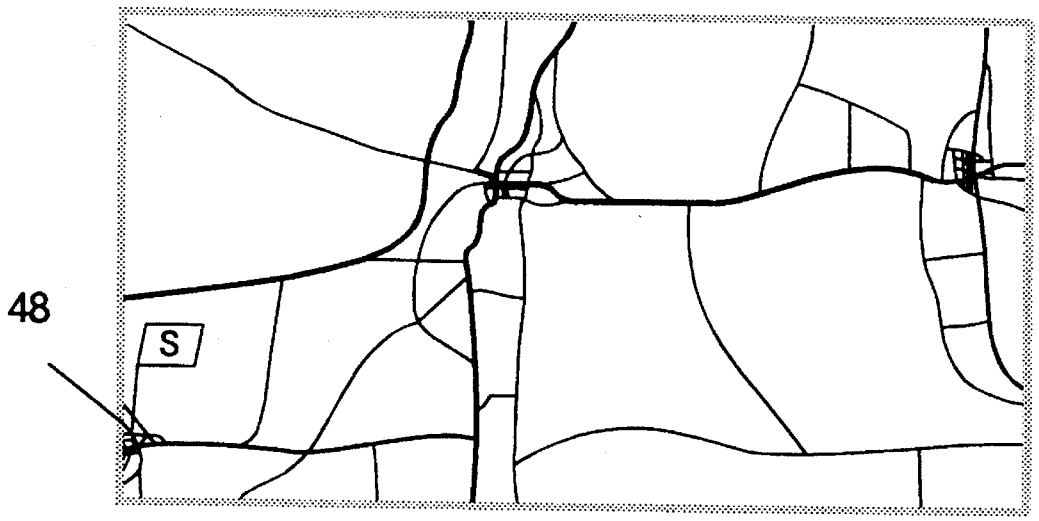
FIG. 4 illustrates an example of a route input screen of one embodiment of the present invention.
Figure 5:
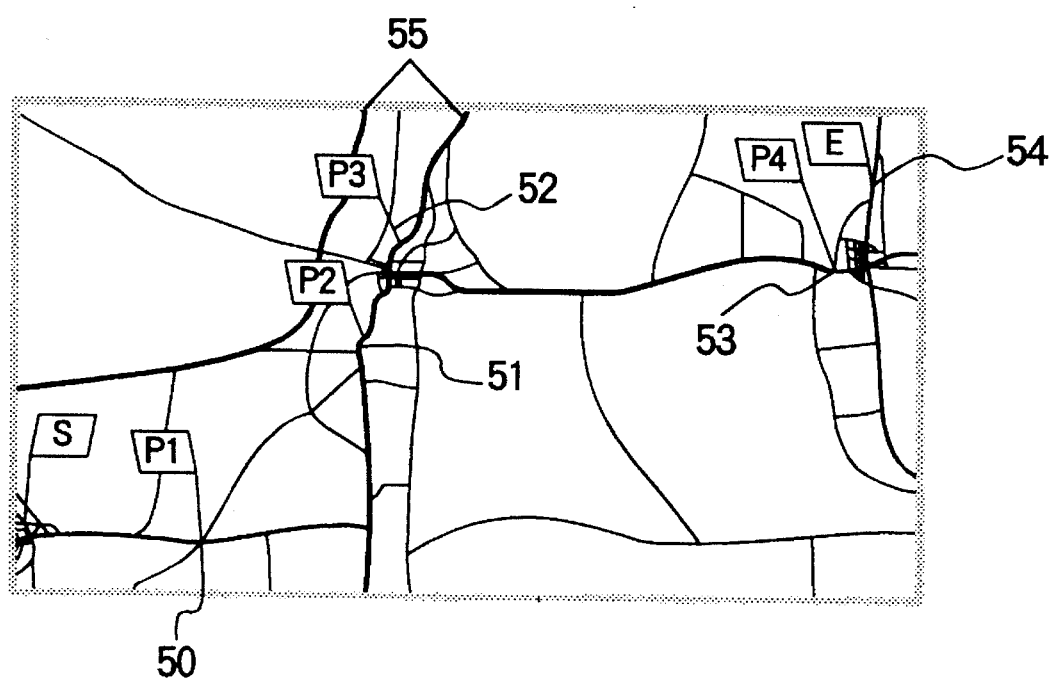
FIG. 5 illustrates a display screen of one embodiment of the present invention after the route input.
Figure 6:
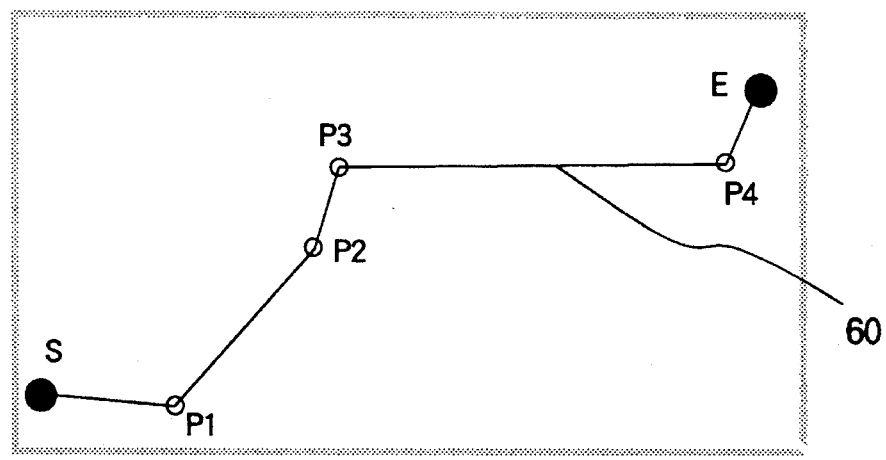
FIG. 6 is a route map of one embodiment of the present invention.

The user uses the map information storage 21 to search the map information including the route starting point S (48) illustrated in FIG. 4 input by means of the input means 21. The display means 24 displays a map shown in FIG. 4 having a scale preferred by the user (Step 1). The user then uses the input means 20 to input on the displayed map, the starting point S (48), the passing points P1, P2, P3, and P4 designated by reference numerals 50 through 53 in FIG. 5, and the point of destination E designated by reference numeral 54 in accordance with the the user's route order instructions (Step 2), which points are all stored in the route storage means 25. With the above-described input operations performed, the user completes all the input operations. With the starting point S, passing points P, and point of destination E designated with reference numerals 48 through 54 input by means of the input means 20, the user uses the main road indentifying means 27 to extract national roads and toll roads from the subview showing the map information of the area (Step 3) for storaging in the main road storage means 28 (Step 4). Using the route map preparing means 23, the user reads in the data from the route storage means 25 and successively joins the starting point and the passing points P to the point of destination E using route line 60, thereby completing the route map (Step 5).

Figure 7:
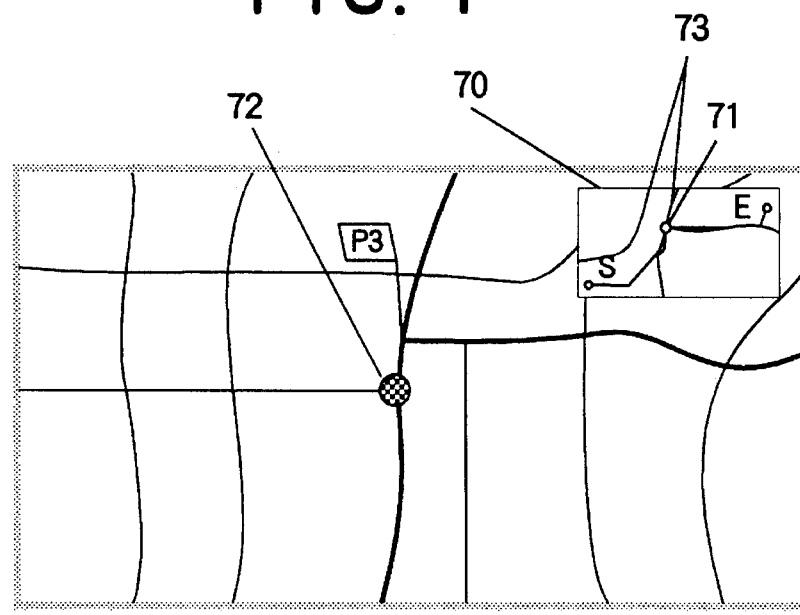
FIG. 7 illustrates a display screen of one embodiment of the present invention after display operations.
Figure 8:
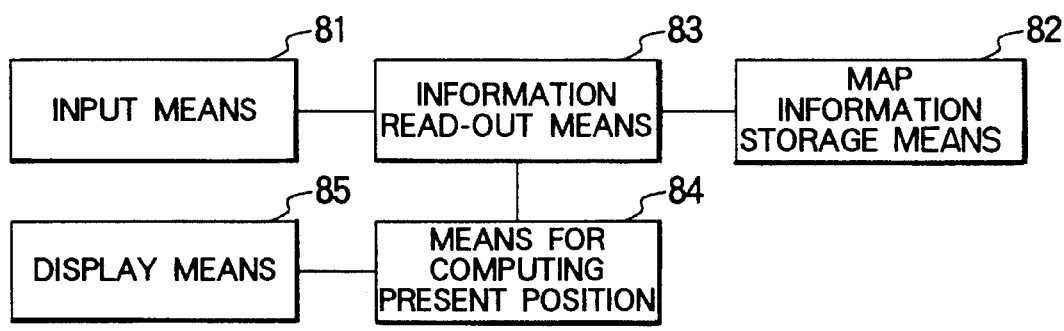
FIG. 8 is a block diagram showing the conventional functional portions.
Figure 9:
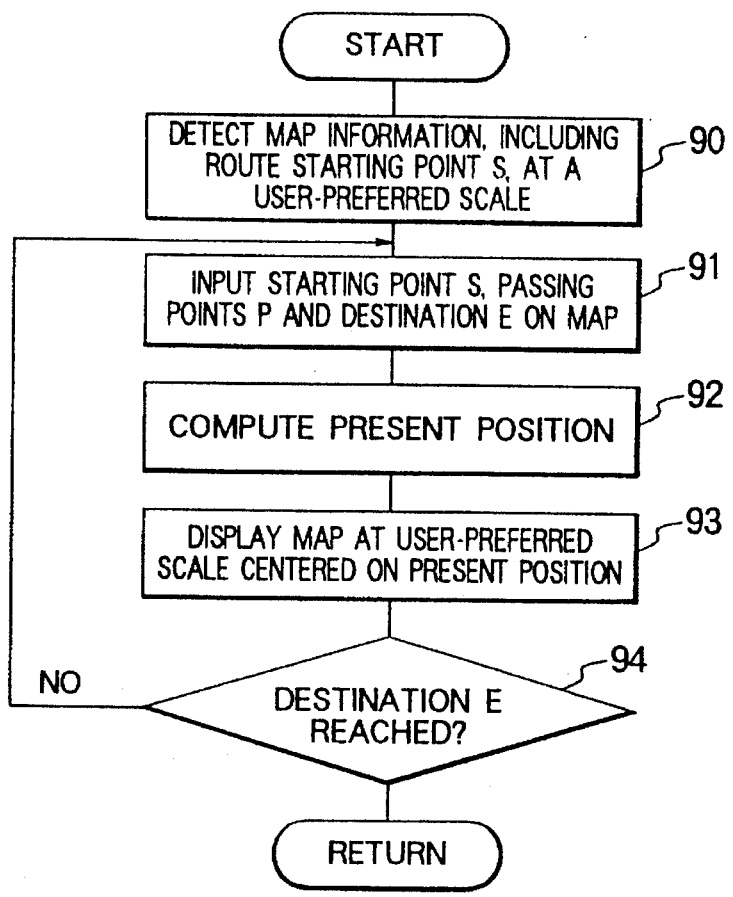
FIG. 9 is a conventional flow chart.
Figure 10:
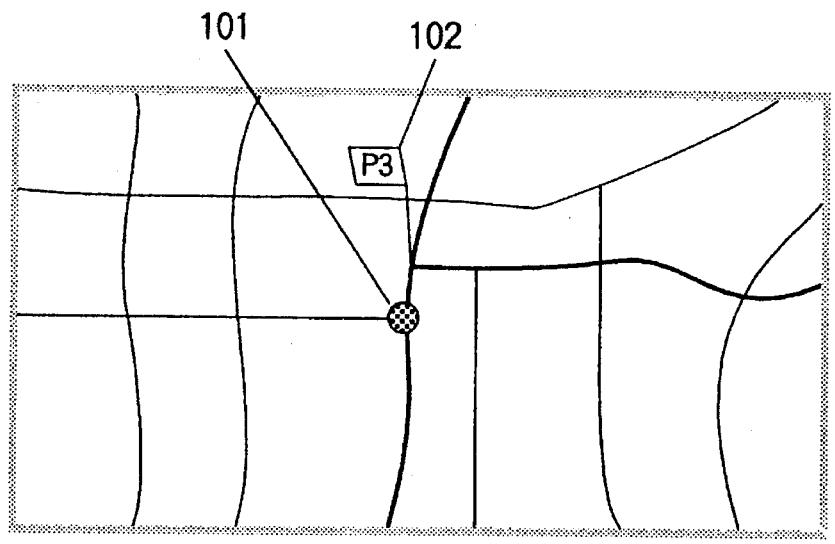
FIG. 10 illustrates a display screen after the conventional display operations have been performed.

When navigation is started, the user uses the present position detecting means 26 to detect the present position of one's own vehicle (Step 6). Here, using the input means 20, the user selects whether or not to display the route map (shown in FIG. 6) prepared by himself on a subview 70 (shown in FIG. 7) (Step 7). If the user decides to display the route map on the subview, he proceeds to Step 8, and decides whether or not to superimpose the main roads on the map. If he chooses to superimpose the main roads, the main roads 73 stored in the main road storage means 28 are displayed by means of Step 9. The user then proceeds to Step 10 so that the route map and the main roads are displayed as shown in FIG. 7 in the subview 70 of the display means 24 of the present embodiment illustrated in FIG. 7. The vehicle's present position detected as described above (Step 6) is displayed in the corresponding position in the route map as the present position of the vehicle 71 (Step 11).

Using the present position of the vehicle 71 detected in the Step 6, the user by Step 22 displays a map on the display means 24, having a scale which permits easy reading of the road information on the map, with the center thereof corresponding with the point 72 of one's own vehicle thereon. The vehicle is navigated by repeating Steps 6 through 12 until the response to the question posed in Step 13 (Destination E Reached?) is yes, in accordance with the routes input in Step 2.

What is claimed is:

1. A map display apparatus comprising:

a map information memory which stores map information including information relating to main roads;

an information read-out means which reads out the map information stored in said map information memory;

a display means which displays the map information read out by said map information read-out means from said map information memory;

a route map preparing means which prepares, on the displayed map, a route map made up of line segments which connect a starting point, successive passing points and a point of destination along a desired travel path;

a main road identifying means which reads out said information relating to main roads from said map information memory;

means for detecting a present position of the map display apparatus; and a control means which carries out control operations on the display means when said display means is displaying said map information read out by said information read-out means and said present position detected by said means for detecting said present position, said control operations including providing a subview on said display means, said subview displaying a map including said route map, said present position and said information relating to main reads read out of said map information memory by said main road identifying means, said information relating to main roads being displayed over said route map in correspondence with said route map.

2. A map display apparatus for a vehicle, comprising:

a display means which displays map information including information relating to main roads;

a route map preparing means which prepares on the map displayed by said display means a route map comprising line segments connecting a starting point, successive passing points and an end point along roads, of a desired travel path;

a main road identifying means which reads out said information relating to main roads from said map information memory;

a means for detecting a present position of the vehicle; and a control means which carries out control operations on the display means when said display means is displaying said map information and said present position detected by said means for detecting said present position, said control operations including providing a subview on said display means, said subview displaying a map including said route map; said present position and said information relating to main roads read out of said map information memory by said main road identifying means, said information relating to main roads being displayed over said route map in correspondence with said route map.

3. A map display apparatus according to claim 1, wherein said map information memory comprises map information storage 4. A map display apparatus according to claim 3, wherein said map information storage means comprises a CD-ROM memory.

5. A map display apparatus according to claim 1, wherein said display means displays said map information on a screen, and said subview is displayed on said screen.

6. A map display apparatus according to claim 1, wherein said display means displays said map information and said present position.

7. A map display apparatus according to claim 2, wherein said vehicle is a car.

8. A map display apparatus according to claim 2, wherein said display means displays said map information on a screen.

9. A map display apparatus according to claim 2, wherein said map information memory comprises map information storage means.

10. A map display apparatus according to claim 9, wherein said map information storage means comprises a CD-ROM.

* * * * *